Figure 1:
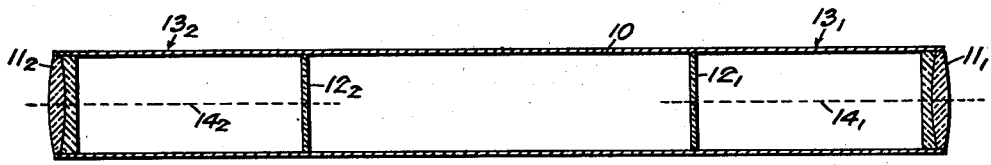

June 20, 1950      I. C. GARDNER      2,511,840
SELF-COMPENSATING OPTICAL SYSTEM FOR TELEMETERS
Filed March 30, 1942      2 Sheets-Sheet 1

Inventor
Irvine C. Gardner

By G. J. Kessenich & J. H. Church
Attorneys

June 20, 1950     I. C. GARDNER     2,511,840
SELF-COMPENSATING OPTICAL SYSTEM FOR TELEMETERS
Filed March 30, 1942     2 Sheets—Sheet 2
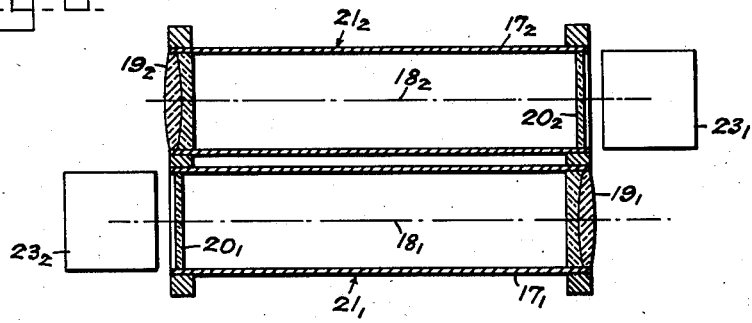
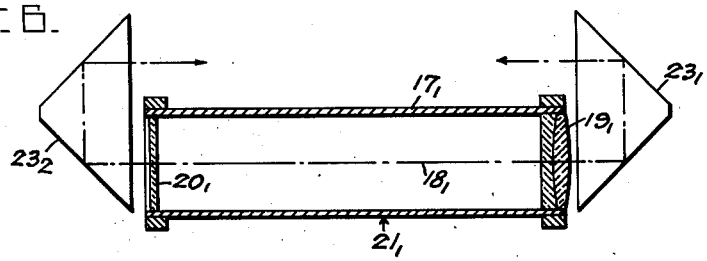
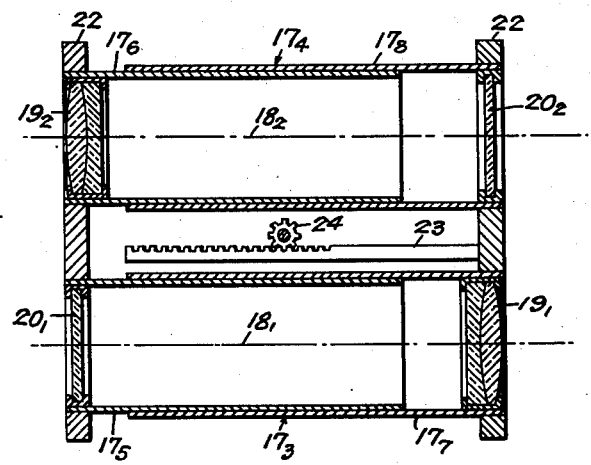
Inventor
Irvine C. Gardner

Patented June 20, 1950

2,511,840

UNITED STATES PATENT OFFICE

2,511,840

SELF-COMPENSATING OPTICAL SYSTEM FOR TELEMETERS

Irvine C. Gardner, Chevy Chase, Md., assignor to the United States of America as represented by the Secretary of War Application March 30, 1942, Serial No. 436,832

9 Claims. (Cl. 88—2.7)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to improvements in optical telemeters and is more particularly adapted for use in rangefinders or heightfinders of the self-contained base type.

It is a primary object of the invention to provide a telemeter of the character referred to which will be far less sensitive to changes effected by external conditions than present day telemeters, whereby the errors introduced by such changes may be greatly minimized or completely obviated.

A further object of the invention is to provide a telemeter that will require only infrequent adjustment if any adjustment is required at all.

Still a further object of the present invention is to provide a telemeter having main optical systems possessing the same degree of stability as that inherent in the present day internal adjustor.

Still a further object of the invention is to provide a telemeter of such inherent stability that it may be focused for objects at different distances without loss of adjustment.

Through a comprehensive study of telemeters with a view of determining the errors therein and their sources I have found that the greatest instability exists in the main optical systems. The measuring wedges and scales found in the modern telemeter are of good design and if properly constructed do not contribute to the variable performance of the instrument. Similarly the elements of the optical system lying between the two reticles and the eyes of the observer, if of workmanlike quality, will not affect the range reading. Further, translations or rotations of the end penta-reflectors within the limits corresponding to good mechanical construction do not introduce errors. The chief causes for the inconsistent performance of the telemeter are the following:

1. Temperature gradients in the air within the body of the telemeter.
2. Bending of the optical tube. This may be produced by mechanical strains or by temperature gradients.
3. Variation in the deviations produced by the two penta-reflectors. These variations arise from non-uniform expansion resulting from temperature gradients.
4. Parallax between the target and the reticle as viewed through the telemeter. This parallax is present because the telemeter of present design does not permit the advantageous application of a focusing adjustment for varying the distance between each objective and its corresponding reticle as is required if parallax is to be eliminated for targets at different distances.

As to the first cause, temperature gradients produce gradients in the index of refraction of the air and this deviates the rays travelling along the axis of the telemeter body. The errors arising from this cause as well as a solution to the problem are disclosed in U. S. Patent 1,968,267 to R. Straubel, dated July 31, 1934.

A solution of the problem created by the third cause is disclosed in my copending application, Serial No. 432,412, filed February 26, 1942, now Patent No. 2,400,111 dated May 14, 1946, and the instant disclosure reveals a solution of the problem caused by the second and fourth causes above enumerated.

As is well known by those skilled in the art telemeters of the self-contained base type are provided with an internal adjustor which is an auxiliary optical system designed to produce an artificial target optically, at an infinite distance, and adjustment consists in setting the instrument to bring the reading made upon this target into agreement with the infinite graduation on the range scale. In order that the adjustor may satisfactorily serve its purpose the optical system thereof is so designed and constructed that its performance may be expected to be independent of variation resulting from temperature changes and mechanical strains which affect the main optical system. This freedom from variation should be within the limits of precision of the telemeter. For a telemeter with a magnification of 24 an angular variation of a half-second is significant. Experience has shown that prior art telemeters are so sensitive to slight deformations resulting from temperature changes or mechanical strains that they must be frequently adjusted if serviceable readings of range or height are to be secured. When the ambient temperature is varied there is a considerable period of time during which the telemeter is not in a steady state and, therefore, for perfect operation this process of adjustment should be a continuous one. Where the magnification is increased as it is proposed to do, in the case of heightfinders to 48, the difficulty of maintaining the telemeter in adjustment is greatly accentuated because the significant variation then becomes one quarter-second.

At present this instability of the prior art telemeters is one of their most serious faults and it is a primary object of my invention to eliminate the instability of the main optical system thereof by providing a system that is free from variation due to flexures arising from temperature changes or mechanical strain to such extent that it will be comparable with the internal adjustor above referred to in this respect.

Figure 2:
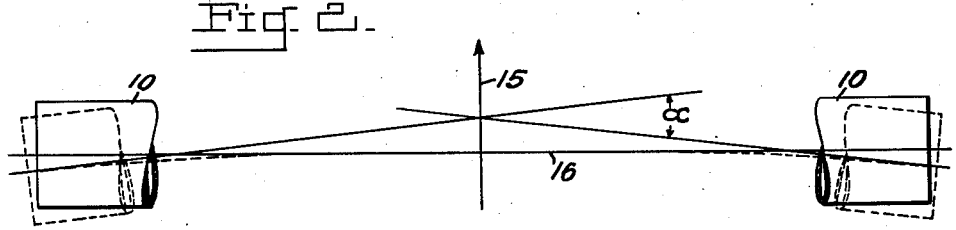
Figure 3:
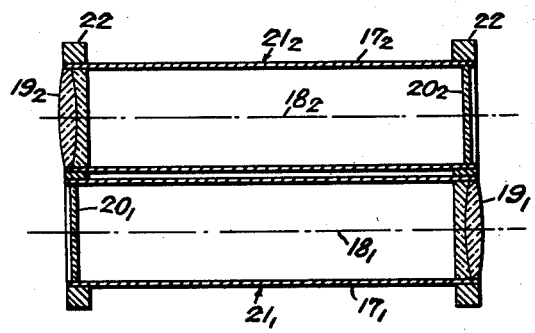
Figure 4:
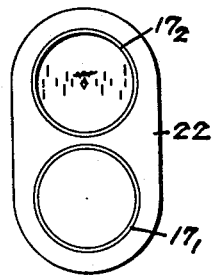

The specific nature of the invention as well as other objects and advantages thereof will clearly appear from a description of a preferred embodiment as shown in the accompanying drawings in which:

Fig. 1 is a diagrammatic sectional view of a conventional optical tube for mounting the main optical systems as employed in prior art self-contained base telemeters, Fig. 2 is a view showing the effect of a transverse temperature gradient upon an optical tube of the type shown in Fig. 1, Fig. 3 is a diagrammatic sectional view of an optical tube system arranged in accordance with the present invention, Fig. 4 is a view in elevation showing one of the end plates used in the optical tube system of Fig. 3, Fig. 5 is a diagrammatic sectional view similar to Fig. 3 showing the addition to the optical tube system of the latter view of two prisms which direct light after passage through the reticles to the erectors and finally the eyepieces located centrally of the telemeter, Fig. 6 shows the structure of Fig. 5 as viewed in the plane of the paper from the side adjacent optical tube $17_1$ with the latter tube shown in section, Fig. 7 is a diagrammatic view showing an optical system similar to that of Figs. 3, 5, and 6 provided with a focusing adjustment.

Referring now to the drawings and more particularly to Fig. 1 there is shown an optical tube $10$ of the type universally employed in telemeters of a conventional design before the present invention. Adjacent each end of the tube $10$ there is mounted an objective lens $11_1$ or $11_2$ of the main optical systems and in the focal planes of each of the objectives $11_1$ or $11_2$ are mounted reticles $12_1$ and $12_2$, respectively. These reticles bear the patterns which fuse to produce the wandering mark, and as understood by those skilled in this art each objective forms an image of the target upon its respective reticle. The two or main optical systems generally designated $13_1$ and $13_2$ are comprised of the objective $11_1$—reticle $12_1$ and objective $11_2$—reticle $12_2$, respectively, and are mounted in such manner as to have their axes $14_1$ and $14_2$ nominally lying in the same straight line. Any variation in the angle between the axes $14_1$ and $14_2$ must be compensated for by an adjustment of the telemeter if the correct range is to be determined by the telemeter. In telemeters of the type above referred to the optical tube is comparatively slender for its length and consequently is subject to flexing under the slightest mechanical strain. As a matter of fact the optical tube is so sensitive to flexure that it must be carefully supported in a heightfinder to avoid significant flexures introduced by its own weight when the instrument is trained on targets at different angular heights. As a result of my research I have found that this type of optical tube is particularly responsive to a temperature gradient. For a thirteen-foot telemeter the optical tube is two meters long and as shown in Fig. 2 a gradient $15$ transverse to the axis $16$ of the tube (which contains the axes $14_1$, $14_2$) amounting to 0.01° C. per millimeter (which corresponds approximately to a temperature difference of 1 degree between the top and bottom of the tube) will cause the tube to bend through an angle $a$ of approximately 40 seconds measured as the change in angle between tangents to the axis of the tube at its extreme ends.

In Fig. 3 I have shown an optical tube system in accordance with my present invention which will not be subject to the effects of a transverse temperature gradient as is the case of a tube of the form shown in Fig. 1. The tube system comprises two optical tubes $17_1$ and $17_2$ arranged side by side with their axes $18_1$ and $18_2$ disposed in parallelism. Each tube mounts one of the optical systems $21_1$ or $21_2$ comprising the main optical systems of the telemeter. The optical system $21_1$ comprises the objective lens $19_1$ and reticle $20_1$ while the optical system $21_2$ comprises the objective lens $19_2$ and reticle $20_2$. At each end of the tubes the adjacent objective lens and reticle cells may be mounted in suitable plates $22$ formed of a material having an extremely low coefficient of expansion. I have found fused silica very satisfactory for this purpose as its coefficient of expansion is only one twenty-fifth that of steel. The plates $22$, as clearly shown in Fig. 3, also serve to secure the tubes $17_1$ and $17_2$ in their proper relative positions above described. By arranging the two optical systems $21_1$, $21_2$ in this manner a tube system is provided wherein its length as compared with the length of the single optical tube universally employed heretofore has been substantially reduced with a resulting great reduction in the likelihood of flexure of the system due to mechanical strain. Furthermore, such mechanical flexure as may arise will not alter the parallelism of the axes $18_1$, $18_2$ of the two optical systems $21_1$, $21_2$ since the spacings of the objective $19_1$, reticle $20_2$, and objective $19_2$, reticle $20_1$ remain unchanged independent of such flexure. Moreover, by arranging the tubes $17_1$, $17_2$ in the manner shown in Fig. 3, whether or not the fused silica supports $22$ are used, a transverse temperature gradient will not alter the parallelism of the axes $18_1$, $18_2$ of the two optical systems $21_1$, $21_2$ for the same reason that the errors normally arising from mechanical flexure have been obviated. A longitudinal temperature gradient will affect the parallelism of the axes $18_1$, $18_2$ because the temperature at the opposed ends of the tube system will be different with consequent differing amounts of expansion. However, if the fused silica end plates $22$ are employed and a longitudinal temperature gradient of 0.01° C. per millimeter is assumed, the total angular change will amount to approximately 0.1 second, which is a great improvement over the performance of the type of mounting for the main optical systems shown in Fig. 1.

In Figs. 5 and 6 the optical tube system of Fig. 3 is shown with prisms $23_1$ and $23_2$ added to direct the light after passage through the reticles $20_2$ and $20_1$, respectively, to erector prisms and finally to the eyepieces located in the usual position near the center of the telemeter. The erectors and eyepieces form no part of the present invention and have, therefore, been omitted for the sake of clarity. As hereinbefore referred to, variations in the performance of the prisms $23_1$ and $23_2$ will not affect the accuracy of the range reading of the telemeter because they cannot change the relative positions of the images formed on the reticles since this latter relation is dependent upon the relative positions of the objectives and reticles alone.

Telemeters of the type having optical tube systems similar to the one shown diagrammatically in Fig. 1 are not provided with focusing movement for the purpose of varying the distance between objective $11_1$ and reticle $12_1$ or objective $11_2$ and reticle $12_2$, because any mechanical movement effecting a change in the spacing of these elements would as a consequence of the normal unavoidable inaccuracies of construction thereof introduce components of movement transverse to the axis of the optical tube system and thereby materially disturb the adjustment of the telemeter in a manner similar to that arising from subjecting the telemeter to mechanical flexures or flexures attributable to the presence of temperature gradients as above described. In an optical tube system arranged in accordance with my invention, however, I am enabled to introduce focusing movement of the objectives and reticles without accompanying disturbance of adjustment of the telemeter and to this end I have shown in Fig. 7 an optical tube system similar to that shown in Fig. 3 but provided with a suitable focusing movement.

In the structure of Fig. 7 the optical tubes $17_3$, $17_4$ of the system are each comprised of two sections ($17_6$—$17_7$) and ($17_6$—$17_8$), respectively, arranged in telescopic engagement with each other for relative longitudinal movement. The focusing movement comprises a rack 23 suitably attached to one of the plates 22 with its teeth disposed in meshing relation with a pinion 24 supportably journaled in any desirable manner on the telemeter housing whereby rotation of the pinion will translate the rack and simultaneously move the optical tube sections relative to each other to change the spacing of objective $19_2$ and reticle $20_2$ and of objective $19_1$ and reticle $20_1$. As will be observed the focusing movement just described is so constructed that objective $19_1$ and reticle $20_2$ are translated as a unit with respect to objective $19_2$ and reticle $20_1$ in a direction parallel to the common direction of the parallel axes $18_1$ and $18_2$. It follows that the objective $19_1$ and reticle $20_2$ and of objective $19_2$ and reticle $20_1$ remain fixed as in the case of the structure of Fig. 3 and that any resulting transverse components of movement resulting from the unavoidable inaccuracies of the focusing movement will not alter the parallelism of axes $18_1$ and $18_2$.

In all forms of the invention the main optical systems of the telemeter are so mounted as to be self-compensating for distortions introduced by mechanical strain or temperature changes within the limits of precision of such instruments.

Having now described what is at present considered to be a preferred embodiment of the invention, I claim:

1. In a telemeter of the self-contained base type, an optical tube system comprising a pair of tubular members arranged side by side on parallel axes, an objective mounted on the end portion of one of said tubular members, a second objective mounted on the diagonally opposed end portion of the other one of said tubular members, a reticle mounted on the end portion of each tubular member remote from the objective in said tubular member, said objectives being of identical focal length and the length of said tubular members being substantially equal to said focal length.

2. In a telemeter of the self-contained base type, a pair of main optical systems comprising a pair of objectives, optical tube means mounting said objectives on parallel axes in laterally spaced relation to each other a limiting distance measured along said axes less than the sum of the focal lengths of said objectives, and focusing means for varying the relative distance along said axes between said objectives within said first named distance.

3. In a telemeter of the self-contained base type, a pair of main optical systems comprising a pair of objectives, optical tube means mounting said objectives on parallel axes in spaced relation to each other a distance less than the sum of the focal lengths of said objectives, a reticle mounted in said optical tube means adjacent each objective in the image plane of the opposed objective, and focusing means for varying the relative distance between said opposed objectives and reticles.

4. In a telemeter of the self-contained base type, a pair of main optical systems comprising a pair of objectives, a pair of optical tubes means mounting said objectives on parallel axes in spaced relation to each other a distance less than the sum of the focal lengths of said objectives, a reticle mounted in each of said optical tube means adjacent each objective in the image plane of the opposed objective, said optical tube means each comprising a plurality of sections telescopically joined intermediate said opposed objectives and reticles, and focusing means for relatively sliding said telescopically joined sections.

5. In a telemeter of the self-contained base type, a pair of main optical systems comprising a pair of objectives of identical focal length, optical tube means mounting said objectives on parallel axes in spaced relation to each other a distance equal to said focal length, and a reticle mounted in said optical tube means adjacent each objective in the image plane of the opposed objective; whereby said optical tube means may be reduced in length to substantially said focal length, and means having a coefficient of expansion less than the coefficient of expansion of steel, mounting each of said objectives and reticles in said optical tube means.

6. In a telemeter of the self-contained base type, a pair of main optical systems comprising a pair of objectives of identical focal length, optical tube means mounting said objectives on parallel axes in spaced relation to each other a distance equal to said focal length, and a reticle mounted in said optical tube means adjacent each objective in the image plane of the opposed objective; whereby said optical tube means may be reduced in length to substantially said focal length, and means comprising fused silica means mounting said objectives and reticles in said optical tube means.

7. In a telemeter of the self-contained base type, a pair of main optical systems, each said system comprising an objective and a reticle aligned along respective axes, optical tube means mounting said axes in parallel spaced relation to each other a distance less than the sum of the focal lengths of said objectives, said objectives being mounted at opposite ends of said optical tube means and each reticle being mounted in said tube means substantially coplanar with the objective of the other said system, and fused silica means for securing said tubular members to each other in said parallel relation.

8. In a telemeter of the self-contained base type, a pair of main optical systems, each said system comprising an objective and a reticle aligned along respective axes, optical tube means mounting said axes in parallel spaced relation to each other a distance less than the sum of the focal lengths of said objectives, said objectives being mounted at opposite ends of said optical tube means and each reticle being mounted in said tube means substantially coplanar with the objective of the other said system, and fused silica means for mounting said objectives and reticles.

9. In a telemeter of the self-contained base type, a pair of main optical systems, each said system comprising an objective and a reticle aligned along respective axes, optical tube means mounting said axes in parallel spaced relation to each other a distance less than the sum of the focal lengths of said objectives, said objectives being mounted at opposite ends of said optical tube means and each reticle being mounted in said tube means substantially coplanar with the objective of the other said system, and fused silica plates for mounting said objectives and reticles and securing said tubular members to each other in said parallel relation.

IRVINE C. GARDNER.

REFERENCES CITED

The following references are of record in the file of this patent:

UNITED STATES PATENTS

| Number | Name | Date |
|---|---|---|
| 943,109 | Eppenstein | Dec. 14, 1909 |
| 1,006,699 | Straubel | Oct. 24, 1911 |
| 1,313,495 | Michelson | Aug. 19, 1919 |
| 1,452,675 | Carssow | Apr. 24, 1923 |
| 1,869,417 | Grunberg | Aug. 2, 1932 |

FOREIGN PATENTS

| Number | Country | Date |
|---|---|---|
| 139,437 | Great Britain | Mar. 4, 1920 |
| 416,398 | Great Britain | Sept. 13, 1934 |